(12) United States Patent
Isley

(10) Patent No.: US 9,283,580 B2
(45) Date of Patent: Mar. 15, 2016

(54) CAR WASH WAND WITH LED LIGHT

(71) Applicant: Calvin Ross Isley, Stony Plain (CA)

(72) Inventor: Calvin Ross Isley, Stony Plain (CA)

( * ) Notice: Subject to any disclaimer, the term of this patent is extended or adjusted under 35 U.S.C. 154(b) by 122 days.

(21) Appl. No.: 14/158,415

(22) Filed: Jan. 17, 2014

(65) Prior Publication Data

US 2015/0202642 A1    Jul. 23, 2015

(51) Int. Cl.
| | |
|---|---|
| B05B 15/00 | (2006.01) |
| B05B 9/01 | (2006.01) |
| B05B 17/08 | (2006.01) |
| B05B 9/08 | (2006.01) |
| B05B 15/06 | (2006.01) |
| F21V 33/00 | (2006.01) |
| B08B 1/00 | (2006.01) |
| F21Y 101/02 | (2006.01) |
| F21S 9/02 | (2006.01) |
| F21V 23/04 | (2006.01) |
| F21Y 103/00 | (2006.01) |

(52) U.S. Cl.
CPC ............... *B05B 9/01* (2013.01); *B05B 9/0855* (2013.01); *B05B 15/00* (2013.01); *B05B 15/061* (2013.01); *B05B 17/08* (2013.01); *B08B 1/001* (2013.01); *F21V 33/00* (2013.01); *F21S 9/02* (2013.01); *F21V 23/04* (2013.01); *F21Y 2101/02* (2013.01); *F21Y 2103/003* (2013.01)

(58) Field of Classification Search
CPC .......... B05B 17/08; B05B 15/00; B05B 9/01; B05B 15/061; B05B 9/0855; F21V 33/00; F21V 23/04; B08B 1/001; F21Y 2101/02; F21Y 2103/003; F21S 9/02

USPC .................. 239/18, 289, 332, 525, 530, 532; 362/96

See application file for complete search history.

(56) References Cited

U.S. PATENT DOCUMENTS

| | | | |
|---|---|---|---|
| 4,541,568 A | 9/1985 | Lichfield | |
| 4,552,476 A | 11/1985 | Heraty et al. | |
| 4,834,293 A | 5/1989 | Lichfield | |
| 4,899,940 A | 2/1990 | Leaver | |
| 5,381,962 A | 1/1995 | Teague | |
| 5,421,520 A | 6/1995 | Simonette | |
| 6,116,520 A * | 9/2000 | Lee | 239/289 |
| 6,158,677 A | 12/2000 | Coles | |
| 6,439,472 B1 * | 8/2002 | Lin et al. | 239/18 |
| 6,988,677 B2 | 1/2006 | Sodemann | |
| 7,661,609 B2 | 2/2010 | Dexter | |
| 7,669,787 B2 | 3/2010 | Kelly | |
| 7,753,290 B2 | 7/2010 | Jacques | |
| 7,823,801 B2 * | 11/2010 | McGarry et al. | 239/18 |
| 7,854,398 B2 | 12/2010 | Hahn | |
| 8,074,668 B2 | 12/2011 | Alexander | |
| 8,403,520 B2 * | 3/2013 | Liao et al. | 362/96 |
| 8,905,152 B2 * | 12/2014 | Kling et al. | 239/289 |
| 2004/0177868 A1 | 9/2004 | Kim | |
| 2005/0237742 A1 * | 10/2005 | Wang | 362/253 |
| 2008/0061167 A1 | 3/2008 | Gansebom | |
| 2008/0257988 A1 | 10/2008 | Hahn | |
| 2010/0163646 A1 | 7/2010 | Havlovitz | |

* cited by examiner

*Primary Examiner* — Steven J Ganey
(74) *Attorney, Agent, or Firm* — McQIPLaw; Jeffrey McQuiston

(57) ABSTRACT

Disclosed herein are water spray wands comprising an internal water pipe; a spray handle; a compartment for a battery; and a light.

14 Claims, 2 Drawing Sheets

CAR WASH WAND WITH LED LIGHT

FIELD OF THE INVENTION

The present invention is in the field of hand held washer nozzles.

BACKGROUND OF THE DISCLOSURE

When using a spray washer during minimal ambient light is, the user cannot see with ease whether the area is clean or requires further washing. Many vehicles have hard to reach places, such as in the wheelbase, where dirt and mud accumulate and also extra light is required in order to see whether the dirty location is sufficiently clean. Thus, there is a need in the art for a convenient source of light when using washer.

SUMMARY OF THE INVENTION

Disclosed herein are water spray wands comprising an internal water pipe; a spray handle; a compartment for a battery; and a light.

DETAILED DESCRIPTION OF THE EMBODIMENTS

Disclosed herein are spray nozzles with light.

The devices are described with reference to the enclosed drawings, but those of skill in the art recognize that variations, including those described herein, are still within the scope of the present disclosure.

With respect to the present devices, the term "proximal" refers to a point proximate to where water from a water source enters the spray nozzle, whereas the term "distal" refers to a point proximate to where water exits the spray nozzle.

Figure 1:
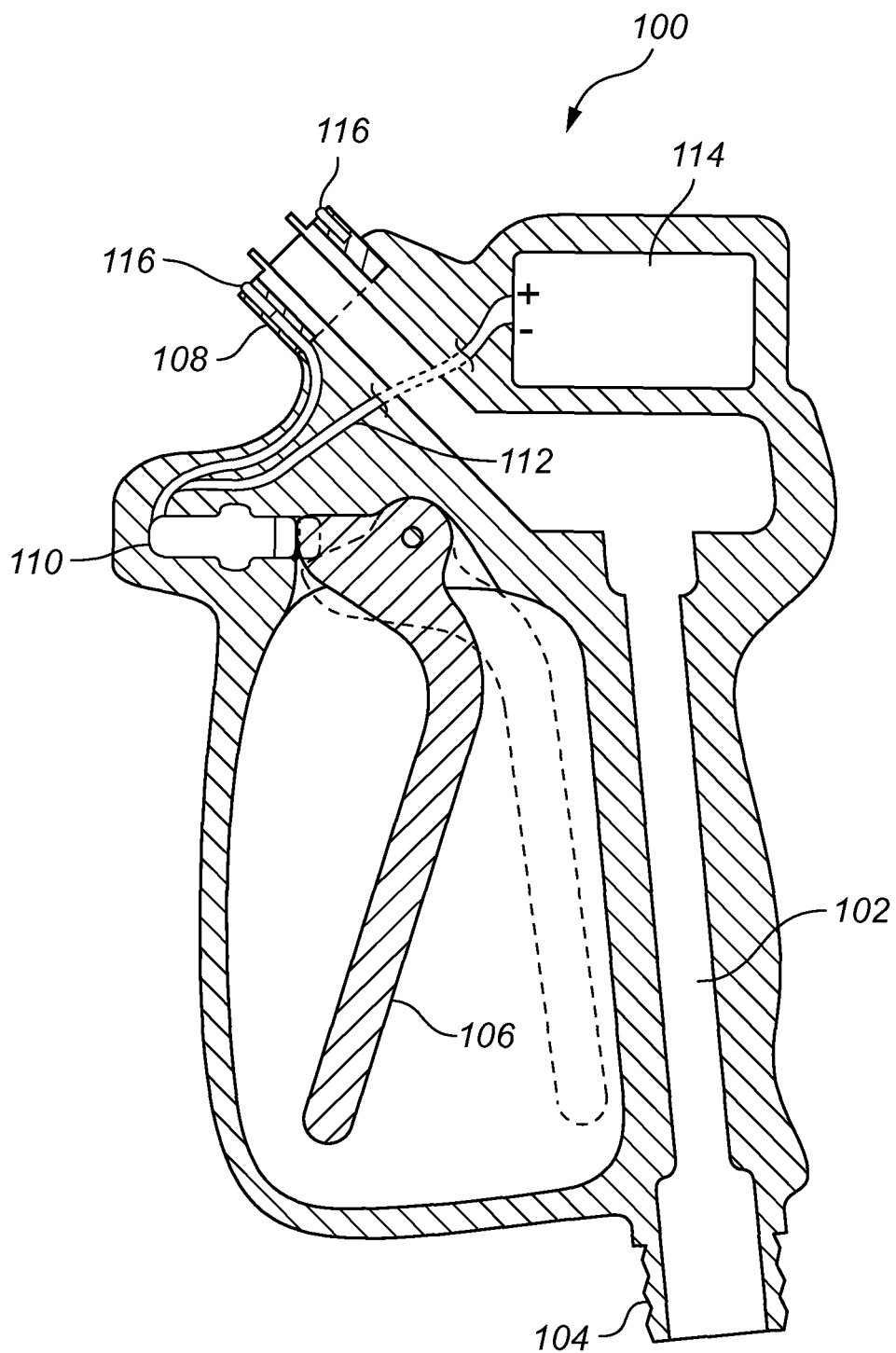
FIG. 1 is a side view showing the components of an embodiment of a spray nozzle with light.

Referring to FIG. 1, disclosed herein is a spray wand with light 100. The wand 100 comprises many of the components found in a currently commercially available spray nozzles. For example, the wand 100 comprises an internal water pipe 102 that allows for water to flow from a proximal intake point 104 to a distal exit point 108. In certain embodiments, the proximal intake point 104 is configured to attach onto a hose or other source of water flow. In some embodiments, the proximal intake point 104 is threaded and is configured to screw onto a hose. In other embodiments the proximal intake point 104 comprises clasps or hooks.

The diameter of the water pipe 102 can vary according to the size of the spray wand 100. In some embodiments, the water pipe 102 has a wide diameter, for example greater than 1.5", to accommodate a heavy water flow, and in other embodiments the water pipe 102 has a narrow diameter, for example less than 0.75". In certain embodiments the pipe 102 is encased by the nozzle 100 and in other embodiments the pipe 102 is exposed.

In some embodiments, the wand 100 comprises a spray handle 106. Once pressed, the spray handle allows water to flow through the pipe 102 to the distal exit point 108. In some embodiments, the handle is configured to lock in the pressed position for long time use, and then released when the use is completed.

In some embodiments, the wand 100 comprises a compartment for a battery 114. In some embodiments, the battery compartment is located internally within the wand 100, whereas in other embodiments the battery compartment is external to the wand 100. The battery compartment is configured to hold a battery 114 and provide electronic communication between the battery 114 and other components of the nozzle 100, as described below. The battery compartment may be configured to accommodate one or more batteries of various shapes and sizes, for example AAA, AA, D, 9 V, etc.

In some embodiments, battery 114 is a rechargeable battery. In some embodiments, the wand 100 comprises a wire that allows for the nozzle 100 to plug into a wall socket so the battery 114 can be recharged. In some embodiments, the battery 114 is recharged using solar energy. In these embodiments, the wand 100 comprises a solar panel in electronic communication with a charger and the battery 114.

The wand 100 comprises at least one light 116 located in proximity to the distal exit point 108. In some embodiments, the light 116 is positioned such that the target of the water flow exiting the exit point 108 is illuminated when the light 116 is lit.

The light 116 is in electronic communication through wires 112 with a switch 110. The switch 110 is in turn in electronic communication with the battery 114 through the extension of wires 112. Thus, when the switch 110 is in the "on" position, the battery 114 is in electronic communication with the light 116 and the light 116 is lit. When the switch 110 is in the "off" position, the electronic communication between the battery 114 and the light 116 is interrupted and the light 116 is off.

In certain embodiments, the handle 106 is attached to the light switch 110. A wire 112 leads from the light switch 110 to a battery 114. In some embodiments, once pressed to allow water flow through the wand 100, the handle 106 turns on the light switch 110 and electricity flows from the battery 114 through the wire 112. This action activates the light 116. In some embodiments, the switch 110 can only be activated when the handle 106 is pressed to allow water flow through the wand 100. In other embodiments the operation of the switch 110 is independent of the operation of the handle 106, such that the user can turn the light 116 on or off regardless of whether the water is flowing through the wand 100.

In the embodiment shown in FIG. 1, the light 116 is built into the wand 100. In other embodiments, for example those shown in FIGS. 2 and 3, the light 116 is contained in a housing 202, which in turn can be attached to the wand 100, as described below.

Figure 2:
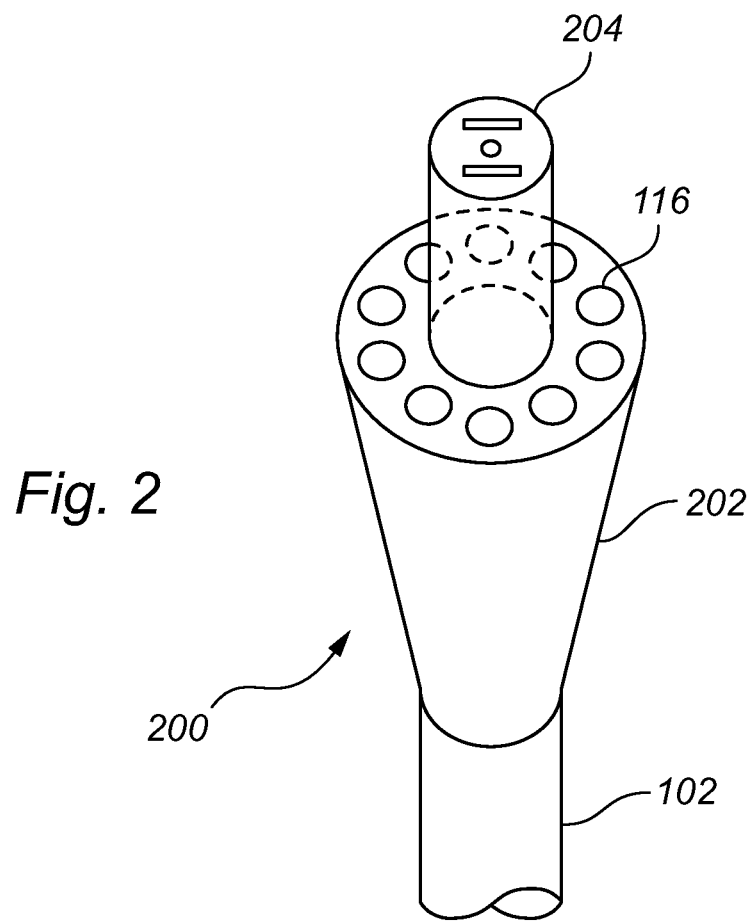
FIG. 2 is a top view showing the components of an embodiment of the head of a spray nozzle with light.

FIG. 2 shows one embodiment of the nozzle 200. The nozzle 200 is located at the exit point 108 and is connected to the pipe 102. The nozzle 200 comprises a housing 202 for the light 116. In this particular embodiment, the housing 202 has a substantially circular cross section and is in a substantially conical shape. In other embodiments, the housing 202 is cylindrical with a substantially circular cross section. Other embodiments include those in which the housing 202 has cross sections with other geometrical shapes, for example regular shapes such as triangles or polygons, or irregular shapes. In certain of these triangles the housing 202 is tapered along the length of the housing 202 such that the diameter of the housing 202 at one end, for example the distal end, is longer than the diameter of the housing 202 at another end, for example the proximal end.

In some embodiments, the nozzle 200 comprises an outlet 204 from which the water exits the wand 100. In some embodiments (not shown), the distal end of the outlet 204 is coplanar with the distal end of the housing 202. In other embodiments, for example that shown in FIG. 2, the outlet 204 protrudes distally from the housing 202, such as the distal end of the outlet 204 is at a distance further distal than the distal end of the housing 202.

In certain embodiments the outlet 204 is detachable. In some embodiments, the housing 202 is detachable. In some embodiments, the outlet 204 can be changed for different spray forces or shapes. In other embodiments the housing 202 is fixed.

The presently disclosed wands 100 comprise at least one light 116 located at the distal end of the wand 100. The light 116 shines in the direction of the water and allows the user of the wand 100 to see where the water is being sprayed. In some embodiments, the light 116 is housed in the housing 202.

In some embodiments (not shown), the housing 202 comprises a single light 116. In other embodiments, for example that shown in FIG. 2, the housing 202 comprises a plurality of lights 116. In certain embodiments, for example that shown in FIG. 2, the plurality of lights 116 are arranged in a circle along the perimeter of the distal end of the housing 202.

In other embodiments, the lights 116 are clustered in various ways including but not limited to, i) one or more lights at 0°, ii) one or more lights at 0° and one or more lights at 180°, iii) one or more lights at 0°, one or more lights at 90°, one or more lights at 180°, and one or more lights at 270°, iv) one or more lights at 0°, one or more lights at 120°, and one or more lights at 240°, and the like. The degrees above refer to the degrees around the circle defined by the top of the housing 202.

In certain embodiments, the lights 116 are fixed onto the housing 202, and in other embodiments the lights 116 are detachable for daylight use. In some embodiments the lights 116 have a fixed illumination direction. In other embodiments the lights 116 can be moved to light areas surrounding the spray target.

Figure 3:
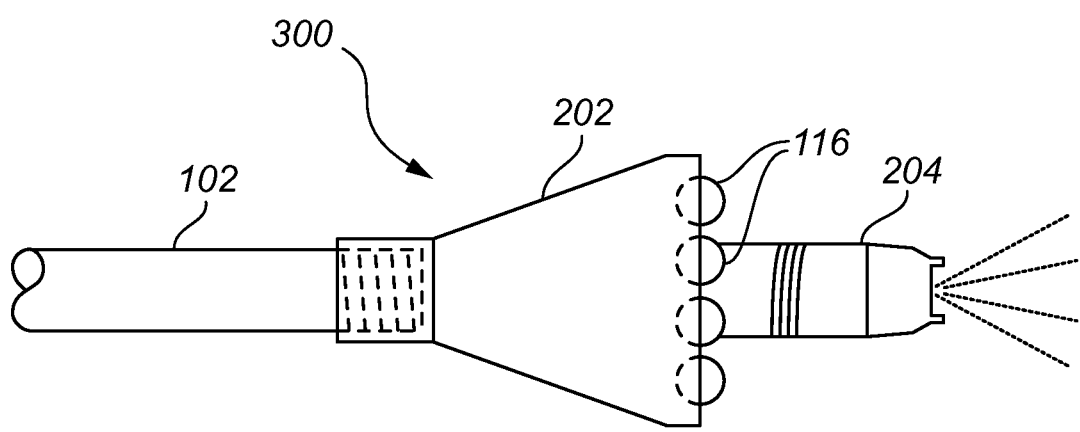
FIG. 3 is a side view showing the components of an embodiment of the head of a spray nozzle with light.

FIG. 3 shows a side view off a nozzle 300. In this embodiment, the outlet 204 extends further than the distal end of the housing 202. The housing 202 is screwed on top of the pipe 102. In some embodiments, the tip of the outlet 204 can be rotated to present different spray patterns, for example, jet, spray, mist, etc.

In certain embodiments the light 116 is an LED light. In other embodiments the light 116 is another type of light, for example those having neon, fluorescent, or incandescent bulbs.

What is claimed is:

1. A water spray wand comprising:
an internal water pipe;
a spray handle;
a compartment for a battery; and
a light,
wherein the spray handle is in electronic communication with both the light and the battery compartment, and
wherein the spray handle is configured such that when the spray handle is activated to allow the flow of water through the spray wand, the electronic communication between the battery compartment and the light is completed, and when the spray handle is deactivated to prevent the flow of water through the spray wand, the electronic communication between the battery compartment and the light is interrupted.

2. The water spray wand of claim 1, wherein the battery compartment is external to the wand.

3. The water spray wand of claim 1, wherein the battery compartment is located internally within the wand.

4. The water spray wand of claim 1, wherein the battery compartment is in electronic communication with the light.

5. The water spray wand of claim 1, wherein the light is positioned such that the target of the water flow exiting the spray wand is illuminated when the light is lit.

6. The water spray wand of claim 1, wherein the light is in electronic communication through wires with a switch.

7. The water spray wand of claim 6, wherein the switch is m electronic communication with the battery compartment.

8. The water spray wand of claim 1, further comprising a housing to house the light.

9. The water spray wand of claim 8, wherein the housing is connected to a distal end of the water spray wand.

10. The water spray wand of claim 8, comprising a plurality of lights.

11. The water spray wand of claim 10, wherein the plurality of light are arranged around the perimeter of the housing.

12. The water spray wand of claim 8, wherein the housing comprises a circular cross-section.

13. The water spray wand of claim 1, comprising a plurality of lights.

14. The water spray wand of claim 1, wherein the light is an LED light.

* * * * *